United States Patent
Kato et al.

[11] Patent Number: 5,936,023
[45] Date of Patent: Aug. 10, 1999

[54] METHOD OF MANUFACTURING COMPOSITE MATERIAL OF CLAY MINERAL AND RUBBER

[75] Inventors: Makoto Kato, Nagoya; Azusa Tsukigase, Chiryu; Arimitsu Usuki, Nagoya; Akane Okada, Obu; Masayoshi Ichikawa; Katsumasa Takeuchi, both of Ichinomiya; Kazuya Watanabe, Nishikamo-gun; Yasushi Miyamoto, Okazaki, all of Japan

[73] Assignees: Kabushiki Kaisha Toyota Chuo Kenkyusho; Toyoda Gosei Co., Ltd., both of Aichi-ken, Japan

[21] Appl. No.: 08/921,575

[22] Filed: Sep. 2, 1997

[30] Foreign Application Priority Data

Sep. 4, 1996 [JP] Japan ................................. 8-255479

[51] Int. Cl.$^6$ ........................................... C08K 3/00
[52] U.S. Cl. ................................. 524/445; 524/442
[58] Field of Search ..................... 524/445, 442

[56] References Cited

U.S. PATENT DOCUMENTS

| | | | |
|---|---|---|---|
| 4,810,734 | 3/1989 | Kawasumi et al. | 523/216 |
| 4,889,885 | 12/1989 | Usuki et al. | 524/445 |
| 5,576,372 | 11/1996 | Kresge et al. | 524/442 |
| 5,576,373 | 11/1996 | Kresge et al. | 524/442 |
| 5,698,624 | 12/1997 | Beall et al. | 524/445 |

FOREIGN PATENT DOCUMENTS

| | | |
|---|---|---|
| 60-4541 | 1/1985 | Japan . |
| 1-198645 | 8/1989 | Japan . |

*Primary Examiner*—Edward J. Cain
*Attorney, Agent, or Firm*—Oblon, Spivak, McClelland, Maier & Neustadt, P.C.

[57] ABSTRACT

The present invention provides a method of manufacturing a composite material made of a rubber and a clay mineral dispersed uniformly therein. The method proceeds exchanging inorganic ions of the clay mineral with organic onium ions to organize the clay mineral; mixing the organized clay mineral and a process oil and/or a plasticizer; and mixing the rubber material with the mixture of the organized clay mineral and the process oil and/or the plasticizer. Process oil and/or plasticizer are intercalated into the organized clay mineral. As a result, the interlayer distance of the clay mineral is enlarged. The most favorable mode of the present invention is for a barrier material against water, gas and the like and for a rubber material required for an improved mechanical property.

18 Claims, 1 Drawing Sheet

METHOD OF MANUFACTURING COMPOSITE MATERIAL OF CLAY MINERAL AND RUBBER

BACKGROUND OF THE INVENTION

1. Field of the Invention

The present invention relates to a method of manufacturing a composite material comprising a rubber and a clay mineral, dispersed uniformly therein in a level of molecule.

2. Description of the Related Art

In order to improve the mechanical property of a rubber material, there have been made researches for mixing clay mineral with the rubber material. For example, in the method disclosed in Japanese Laid-Open Patent Publication No. 1-198645, the clay mineral is organized by using oligomer having onium ions introduced into the end or the side chains thereof, and the organized clay mineral is applied into the rubber material.

In the method disclosed in Japanese Laid-Open Patent Publication No. 60-4541, mica treated with ammonium chloride or choline chloride and process oil are mixed with the rubber material.

The above-mentioned methods have the following problems:

In the art disclosed in Japanese Laid-Open Patent Publication No. 1-198645, the oligomer having the onium ions introduced into the end or the side chains thereof cannot be prepared easily. Further, because the oligomer is intercalated in the clay mineral directly, there are cases in which the clay mineral swells in a low degree.

In the art disclosed in Japanese Laid-Open Patent Publication No. 60-4541, the process oil and the mica are added to the rubber material. The mica treated with ammonium chloride or choline chloride is unmiscible with the process oil. Thus, the mica cannot be dispersed into the rubber material uniformly, with the increase in the amount of the process oil.

SUMMARY OF THE INVENTION

The present invention has been made to solve the above-described problems. It is accordingly an object of the present invention to provide a method of manufacturing a composite material comprising a rubber and a clay mineral, which allows the clay mineral to be dispersed uniformly into the rubber.

In one aspect of the present invention, there is provided a method of manufacturing a composite material comprising a rubber and a clay mineral comprising the steps of exchanging an inorganic ion of a clay mineral with an organic onium ion to organize the clay mineral; mixing the organized clay mineral and a process oil and/or a plasticizer; and mixing a rubber material with the mixture of the organized clay mineral and the process oil and/or the plasticizer and dispersing the clay mineral uniformly in the rubber material.

The clay mineral will swell in water in a high degree, but in an organic solvent in a very low degree.

In order to solve this problem, according to the present invention, an inorganic ion such as a sodium ion and a lithium ion present between silicate layers of the clay mineral is exchanged with an organic onium ion to organize the clay mineral. The resultant clay mineral is hydrophobic. Consequently, the clay mineral can be swelled in the hydrophobic organic solvent.

Then, process oil and/or plasticizer are intercalated into the organized clay mineral. As a result, the interlayer distance of the clay mineral is enlarged. Then, the mixture of the process oil and/or plasticizer and the clay mineral is mixed with a rubber material. Then, the mixture of the process oil and/or plasticizer, the clay mineral, and the rubber material is kneaded. Consequently, the clay mineral can be dispersed uniformly into the rubber material, with interlayer distance of the clay mineral, much larger than in the conventional method.

The above phenomenon is explained as follows:

That is, as shown in FIG. 1, a large number of spaces is formed between silicate layers of a clay mineral 7 when the clay mineral 7 is organized by exchanging the inorganic ions of the clay mineral with organic onium ions 6. This enables a process oil 1 and/or a plasticizer 1 to intercalate into the clay mineral 7.

The process oil and the plasticizer have a high degree of affinity for the rubber material. Therefore, the rubber material intercalates into the clay mineral 7. As a result, the clay mineral 7 swells in a high degree. Accordingly, the clay mineral 7 is capable of dispersing uniformly into the rubber material.

Because the clay mineral is allowed to be dispersed uniformly into the rubber material as described above, the mixture of the rubber material and the clay mineral prevents gas, water and the like from permeating therethrough in a high degree. Because rubber molecules of the composite material is restricted in moving in the vicinity of the silicate layer, mechanical properties of the composite material is improved.

The composite material comprising the rubber and the clay mineral manufactured in accordance with the present invention can be applied to ordinary uses. Furthermore the most favorable mode of the present invention is for a barrier material against water, gas and the like and for a rubber material required for an improved mechanical property.

This and other objects, features and advantages of the present invention will become apparent upon reading of the following detailed description and drawings.

DETAILED DESCRIPTION OF THE INVENTION

Figure 1:
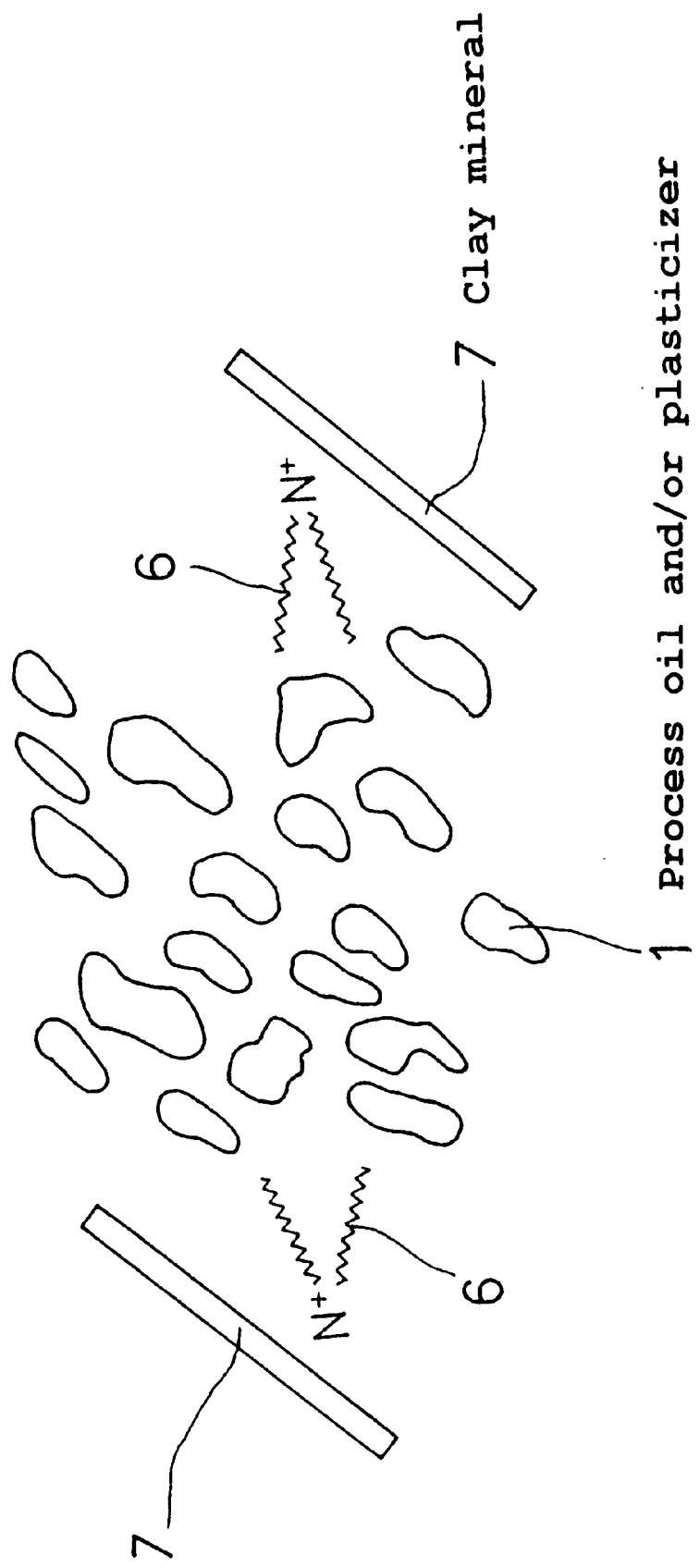
FIG. 1 is an explanatory view showing a composite material comprising a rubber and a clay mineral of the present invention.

The present invention is described below in detail.

Clay minerals having a great contact area with the process oil and/or the plasticizer can be preferably used because such clay minerals can be swelled in a great extent.

Preferably, the ion-exchange capacity of positive ions of the clay mineral is 50 to 200 milligram equivalent/100 g. If the ion-exchange capacity of the positive ions is less than 50 milligram equivalent/100 g, the ion-exchange between the inorganic ions of the clay mineral and the organic onium ions is not accomplished sufficiently, which makes it difficult to swell the clay mineral. If the ion-exchange capacity of the positive ions is more than 200 milligram equivalent/100 g, the interlayers connection force in the clay mineral is great, which makes it difficult to swell the clay mineral.

Preferably, smectite clay minerals (e.g., montmorillonite, saponite, hectolite, beidellite, stevensite, nontronite), vermiculite, halloysite or fluorine mica having swelling property are used as the clay mineral, regardless of whether these clay minerals are natural and synthetic.

The clay mineral is organized by the ion-exchange between the inorganic ion of the clay mineral and the organic onium ion.

Favorably, the number of carbon atoms of the organic onium ion is six or more. More favorably, the number of carbon atoms is 6 to 40. Most favorably, the number of carbon atoms is 6 to 30. The organic onium ion having the above-described number of carbon atoms, and the process oil and/or the plasticizer allow the clay mineral to swell in a high extent.

Preferably, as the organic onium ion, hexyl ammonium ion, octyl ammonium ion, 2-ethylhexyl ammonium ion, dodecyl ammonium ion, octadecyl ammonium ion, dioctyl dimethyl ammonium ion, trioctyl ammonium ion, and distearyl dimethyl ammonium ion can be used.

It is possible to mix oligomer containing a polar group with the clay mineral organized by the ion-exchange, treat the mixture by heating and the like, and then add the process oil and/or the plasticizer to the mixture to swell the clay mineral. As the oligomer containing the polar group, hydrogenated polybutadiene oligomer (manufactured by Mitsubishi Kagaku, trade name: Polytail H) and polyisoprene oligomer (LIR506 manufactured by Kuraray) can be used.

Then, the organized clay mineral is mixed with the process oil and/or the plasticizer.

The process oil means petroleum oils to be used to improve the processability of rubber.

The process oil is not limited to a specific one.

Preferably, the process oil comprises one or more oils selected from paraffinic oils, naphthenic oils, and aromatic oils. These process oils allow the clay mineral to swell in a high degree.

As the paraffinic oils, for example, PX-90, PW-90, PS-90, and PW-380 manufactured by Idemitsu Kosan Co., Ltd. are used. As the naphthenic oils, for example, FLEX1400N manufactured by Fuji Kosan, SUNSEN459 manufactured by Nippon Sun Sekiyu Co., Ltd., NS-100 manufactured by Idemitsu Kosan Co., Ltd., and NM-280 manufactured by Idemitsu Kosan Co., Ltd. are used. As the aromatic oils, for example, AC-460 and AH-58 manufactured by Idemitsu Kosan Co., Ltd. are used.

Of the process oils, the naphthenic oils are most favorable because they allow the clay mineral to swell in a high extent and are compatible with the rubber material.

The plasticizer is not limited to a specific one.

Preferably, the plasticizer comprises one or more compounds selected from ester compounds, phosphate ester compounds, and sulfonamide compounds. These plasticizers allow the clay mineral to swell in a high extent.

As the ester compounds, for example, dibutyl phthalate, butyl benzyl phthalate, ethyl phthalyl ethyl glycolate, dibutyl sebacate, methyl acetylricinolate, di(-2-ethylhexyl) adipate, di(-2-ethylhexyl)azelate are used. As the phosphate ester compounds, tributyl phosphate and the like are used. As the sulfonamide compounds, N-butyl benzene sulfonamide and the like are used.

Preferably, the rubber material comprises at least one rubber selected from natural rubber, isoprene rubber, chloroprene rubber, styrene rubber, nitrile rubber, ethylene-propylene rubber, butadiene rubber, styrene-butadiene rubber, butyl rubber, epichlorohydrin rubber, acrylic rubber, urethane rubber, fluorine rubber, and silicone rubber.

Preferably, the mixing ratio of the organized clay mineral to the process oil and/or the plasticizer is 10:1 to 100. The mixing ratio allows the clay mineral to swell in a high degree. If the mixing ratio of the former to the latter is 10: less than 1, it may be difficult to swell the former in a high extent. If the mixing ratio of the former to the latter is 10: more than 100, there is a possibility that the property of rubber deteriorates.

In exchanging the inorganic ion with the organic onium ion, the clay mineral is dispersed sufficiently in water. Then, the organic onium ion-dispersed water is added to the clay mineral-dispersed water to prepare the organized clay mineral.

The organized clay mineral and the process oil and/or the plasticizer may be mixed with each other at the room temperature. But preferably, they may be mixed with each other at 150° C. to swell the organized clay mineral efficiently.

Then, the mixture of the swelled clay mineral and the rubber material is kneaded at the temperature ranging from the room temperature to 150° C. by means of a kneader such as a mixing roll, a Banbury mixer or a biaxial extruder to knead the mixture efficiently. The mixing roll is most preferable.

In kneading the mixture, an appropriate amount of carbon black, vulcanizing agent, vulcanizing accelerator or the like may be added to the mixture.

The kneaded mixture of the swelled clay mineral and the rubber material is subjected to vulcanizing molding such as press molding to mold the kneaded mixture into products.

DESCRIPTION OF THE PREFERRED EMBODIMENT

EMBODIMENT 1

The method of manufacturing the composite material comprising the rubber and the clay mineral according to the embodiment 1 is described below.

The outline of the method of manufacturing the composite material comprising the rubber and the clay mineral is described below. First, a clay mineral is organized by exchanging inorganic ions of the clay mineral with organic onium ions. Then, the organized clay mineral and a process oil for rubber are mixed with each other. Then, the mixture is mixed with a rubber material. In this manner, the composite material comprising the rubber and the clay mineral dispersed uniformly therein is obtained.

As the clay mineral, montmorillonite of sodium type (produced in Yamagata Prefecture, ion-exchange capacity: 120 meq/100 g) was used. As the organic onium ion, distearyl dimethyl ammonium ion in which the number of carbon atoms was 38 was used. As the process oil, FLEX1400N (manufactured by Fuji Kosan Co., Ltd.) was used. As the rubber material, natural rubber was used.

First, 20 g of montmorillonite was dispersed in 2,000 ml of water having a temperature of 80° C. Then, 21 g of distearyl dimethyl ammonium chloride was dissolved in 1,500 ml of water having a temperature of 80° C. The montmorillonite-dispersed liquid and the distearyl dimethyl ammonium ion-dissolved liquid were mixed with each other quickly. The precipitate was washed twice with water having a temperature of 80° C. In this manner, the organized montmorillonite was obtained by the ion-exchange between the inorganic ions of the montmorillonite and the distearyl dimethyl ammonium ions. The organized montmorillonite is hereinafter referred to as DSDM-montmorillonite.

The inorganic content of the resultant DSDM-montmorillonite was 54.2 wt. %. The interlayer distance of the DSDM-montmorillonite was measured by means of X-ray diffractometry to observe the swelling behavior of the montmorillonite. The interlayer distance thereof was 36.5 Å.

Then, 1 g of the DSDM-montmorillonite and 1 g of FLEX1400N serving as the process oil were mixed with each other at 80° C. for 12 hours. As a result, a clay composite material was obtained.

Measuring the interlayer distance of the DSDM-montmorillonite of the clay composite material by X-ray diffractometry, it was 46.5 Å. The result indicates that the addition of the FLEX1400N (process oil) to the DSDM-montmorillonite increased the interlayer distance of the DSDM-montmorillonite in comparison with the one to which the process oil is not added. That is, the addition of the FLEX1400N to the DSDM-montmorillonite allowed the DSDM-montmorillonite to swell. This indicates that the FLEX1400N intercalated into the DSDM-montmorillonite.

Then, 100 parts by weight of natural rubber, 3 parts by weight of zinc white, 2.25 parts by weight of sulfur, and 2 parts by weight of vulcanizing accelerator were added to 20 parts by weight of the clay composite material containing 10 parts by weight of the clay mineral. The mixture was kneaded by a roll until the components were mixed with each other sufficiently to obtain a kneaded mixture in accordance with ASTM D 3184.

The kneaded mixture was vulcanized at 160° C. for 10 minutes and molded into a sheet having a thickness of 2 mm. Specimens of dumbbell No. 3 were cut off from the sheet and subjected to tensile tests. The result was that the specimens had a tensile strength of 27.5 MPa. The observation of the sheet by means of a permeable type electron microscope revealed that silicate (montmorillonite) layers having a thickness of 1 nm were uniformly dispersed in the rubber.

In a manner similar to the above, a sheet having a thickness of 0.5 mm was formed by molding and evaluated in the water permeability coefficient thereof. The result was $3.9 \times 10^{-5}$ g.mm/mm$^2$ per day.

COMPARISON 1

In comparison 1, a sheet made of a rubber material was manufactured without using the clay composite material as a material of the sheet.

That is, a mixture of 100 parts by weight of natural rubber, 3 parts by weight of zinc white, 2.25 parts by weight of sulfur, and 2 parts by weight of vulcanizing accelerator was kneaded until the components were mixed with each other sufficiently to form the sheet, similarly to the embodiment 1.

The tensile strength of the sheet was 22.7 MPa. The water permeability coefficient thereof was $6.5 \times 10^{-5}$ g.mm/mm$^2$ per day.

EMBODIMENT 2

In embodiment 2, a composite material comprising the rubber and the clay mineral was manufactured by using plasticizer.

A clay mineral was organized by means of octadecyl ammonium ions. As the plasticizer, methyl acetylricinolate was used. As the rubber material, EPDM (ethylene-propylene-diene terpolymer, trade name: EP22) manufactured by Nippon Gosei Gomu Co., Ltd. was used.

The method of manufacturing the composite material comprising the rubber and the clay mineral according to this embodiment is described below in detail.

First 20 g of montmorillonite was dispersed in 2,000 ml of water having a temperature of 80° C. Then, 8.8 g of octadecyl ammonium chloride was dissolved in 1,500 ml of water having a temperature of 80° C. The montmorillonite-dispersed liquid and the octadecyl ammonium chloride-dissolved liquid were mixed with each other quickly. The precipitate was washed twice with water having a temperature of 80° C. In this manner, the organized montmorillonite was obtained by the ion-exchange between the inorganic ions of the montmorillonite and the octadecyl ammonium ions. The organized montmorillonite is hereinafter referred to as C18-montmorillonite.

The inorganic content of the resultant C18-montmorillonite was 69.5 wt. %. Measuring the interlayer distance of the C18-montmorillonite by means of X-ray diffractometry, it was 22.5 Å.

Then, 1 g of the C18-montmorillonite and 1 g of the methyl acetylricinolate serving as the plasticizer were mixed with each other at 80° C. for four hours. As a result, a clay composite material was obtained.

Measuring the interlayer distance of the C18-montmorillonite of the clay composite material by X-ray diffractometry, it was 50.7 Å. The result indicates that the addition of the methyl acetylricinolate serving as the plasticizer to the C18-montmorillonite increased the interlayer distance of the C18-montmorillonite in comparison with the one to which the methyl acetylricinoleate is not added. That is, the addition of the methyl acetylricinolate to the C18-montmorillonite allowed the C18-montmorillonite to swell. This indicates that the methyl acetylricinolate intercalated into the C18-montmorillonite.

Then, 100 parts by weight of EPDM, 20 parts by weight of carbon (Asahi Carbon #70), 3 parts by weight of zinc white, 1.5 parts by weight of sulfur, and 1 part by weight of vulcanizing accelerator were added to 20 parts by weight of the clay composite material containing 5 parts by weight of the clay mineral. The mixture was kneaded by a roll until the components were mixed with each other uniformly to obtain a kneaded mixture in accordance with ASTM D 3568.

The kneaded mixture was vulcanized at 160° C. for 30 minutes and molded into a sheet having a thickness of 2 mm. Specimens of dumbbell No. 3 were cut off from the sheet and subjected to tensile tests. The result was that the specimens had a tensile strength of 20 MPa. The observation of the sheet by means of a permeable type electron microscope revealed that silicate (montmorillonite) layers having a thickness of 1 nm were uniformly dispersed in the rubber.

In a manner similar to the above, a sheet having a thickness of 0.5 mm was formed by molding and evaluated in the water permeability coefficient thereof. The result was $1.0 \times 10^{-6}$ g.mm/mm$^2$ per hour.

COMPARISON 2

In comparison 2, a sheet made of a rubber material was manufactured without using the clay composite material as a material of the sheet.

That is, a mixture of 100 parts by weight of EPDM, 20 parts by weight of carbon, 3 parts by weight of zinc white, 1.5 parts by weight of sulfur, and 1 part by weight of vulcanizing accelerator was kneaded until the components were mixed with each other sufficiently to form the sheet, similarly to the embodiment 2.

The tensile strength of the sheet was 12 MPa. The water permeability coefficient thereof was $1.2 \times 10^{-6}$ g.mm/mm$^2$ per day.

While the invention has been described with reference to embodiments, it is to be understood that modification or variations may be easily made by a person of ordinary skill in the art without departing from the scope of the invention which is defined by the appended claims.

What is claimed is:

1. A method of manufacturing a composite material comprising a rubber and a clay mineral comprising the steps of:

exchanging an inorganic ion of a clay mineral with an organic onium ion to organize the clay mineral;

mixing the organized clay mineral and a process oil and/or a plasticizer; and mixing a rubber material with the mixture of the organized clay mineral and the process oil and/or the plasticizer and dispersing the clay mineral uniformly in the rubber material.

2. The method according to claim 1, wherein the process oil is at least one selected from the group consisting of paraffinic oils, naphthenic oils, and aromatic oils.

3. The method according to claim 1, wherein the plasticizer is at least one selected from the group consisting of ester compounds, phosphate ester compounds, and sulfonamide compounds.

4. The method according to claim 1, wherein the rubber material is at least one selected from the group consisting of natural rubber, isoprene rubber, chloroprene rubber, styrene rubber, nitrile rubber, ethylene-propylene rubber, butadiene rubber, styrene-butadiene rubber, butyl rubber, epichlorohydrin rubber, acrylic rubber, urethane rubber, fluorine rubber, and silicone rubber.

5. The method according to claim 1, wherein the ion-exchange capacity of positive ions of the clay mineral ranges from 50 to 200 milligram equivalent/100 g.

6. The method according to claim 1, wherein the clay mineral is at least one selected from the group consisting of smectite clay minerals, vermiculite, halloysite and fluorine mica having swelling property.

7. The method according to claim 1, wherein the number of carbon atoms of the organic onium ion is 6 or more.

8. The method according to claim 7, wherein the number of carbon atoms of the organic onium ion ranges from 6 to 40.

9. The method according to claim 8, wherein the number of carbon atoms of the organic onium ion ranges from 6 to 30.

10. The method according to claim 1, wherein the organic onium ion is at least one selected from the group consisting of hexyl ammonium ion, octyl ammonium ion, 2-ethylhexyl ammonium ion, dodecyl ammonium ion, octadecyl ammonium ion, dioctyl dimethyl ammonium ion, trioctyl ammonium ion and distearyl dimethyl ammonium ion.

11. The method according to claim 3, wherein the ester compounds consist of dibutyl phthalate, butyl benzyl phthalate, ethyl phthalyl ethyl glycolate, dibutyl sebacate, methyl acetylricinolate, di(-2-ethylhexyl)adipate, and di(-2-ethylhexyl)azelate.

12. The method according to claim 3, wherein the phosphate ester compounds comprise tributyl phosphate.

13. The method according to claim 3, wherein the sulfonamide compounds comprise N-butyl benzene sulfonamide.

14. The method according to claim 1, wherein the mixing ratio of the organized clay mineral to the process oil and/or the plasticizer is 10:1 to 100.

15. The method according to claim 1, further comprising the step of kneading the mixture of the clay mineral and the rubber material at a temperature ranging from a room temperature to 150° C. by means of a kneader.

16. The method according to claim 6, wherein the smectite clay minerals include montmorillonite, saponite, hectolite, beidellite, stevensite and nontronite.

17. The method according to claim 1, further comprising the step of mixing an oligomer containing a polar group with the organized clay mineral.

18. The method according to claim 17, wherein the oligomer is at least one selected from the group consisting of hydrogenated polybutadiene oligomer and polyisoprene oligomer.

* * * * *